United States Patent Office 3,448,811
Patented June 10, 1969

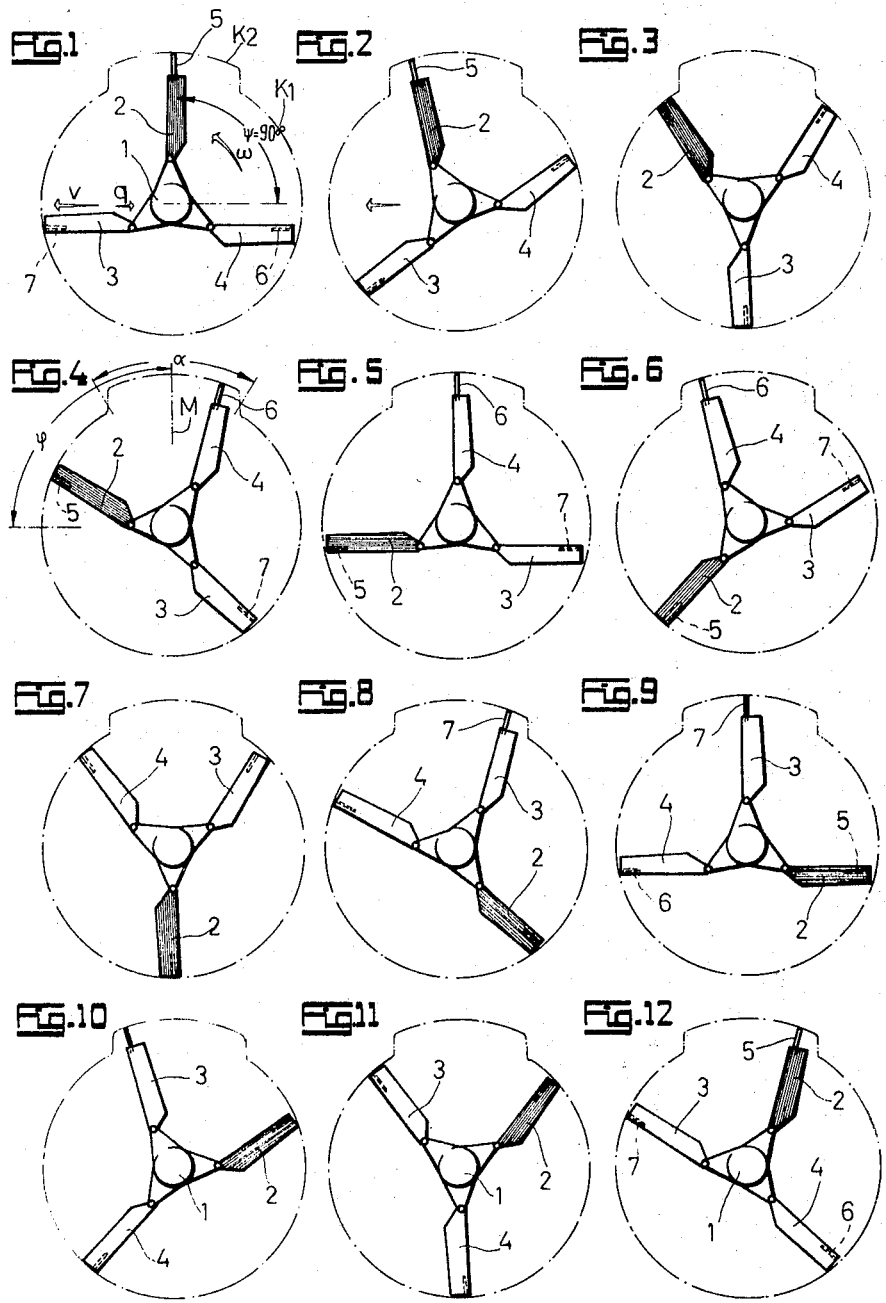

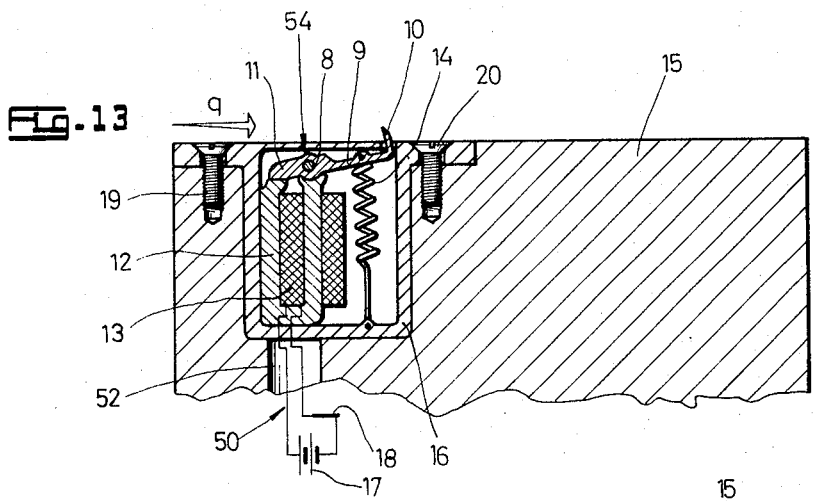
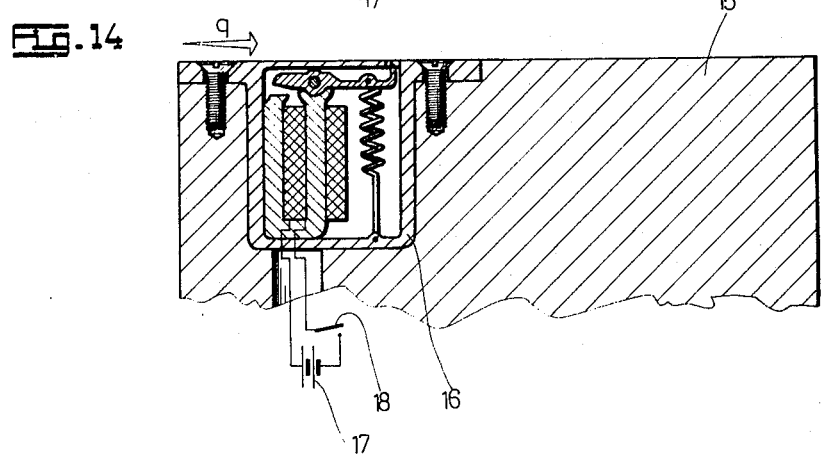
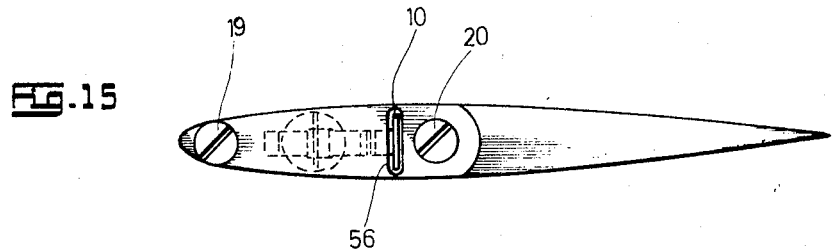

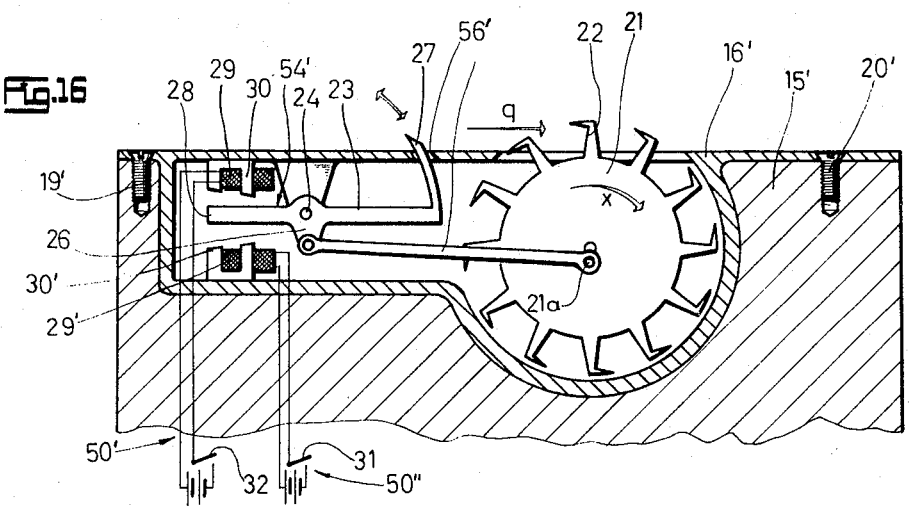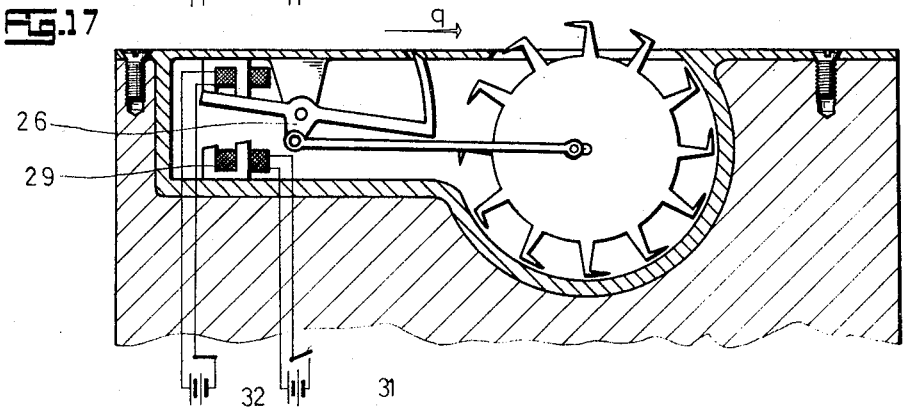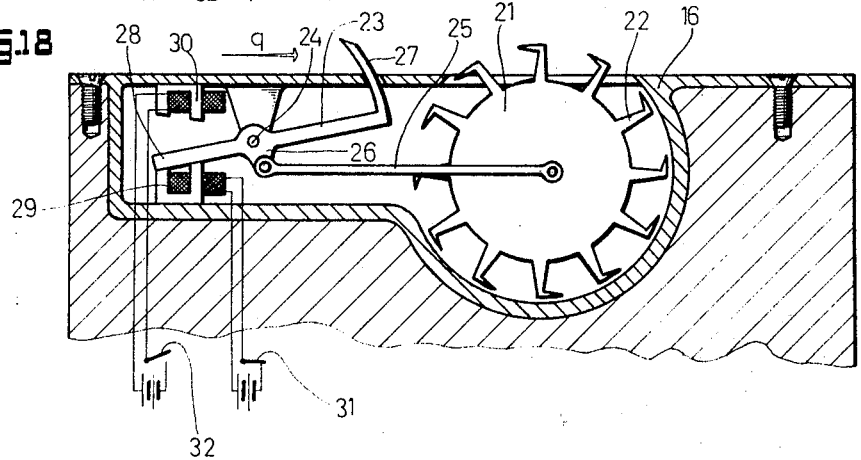

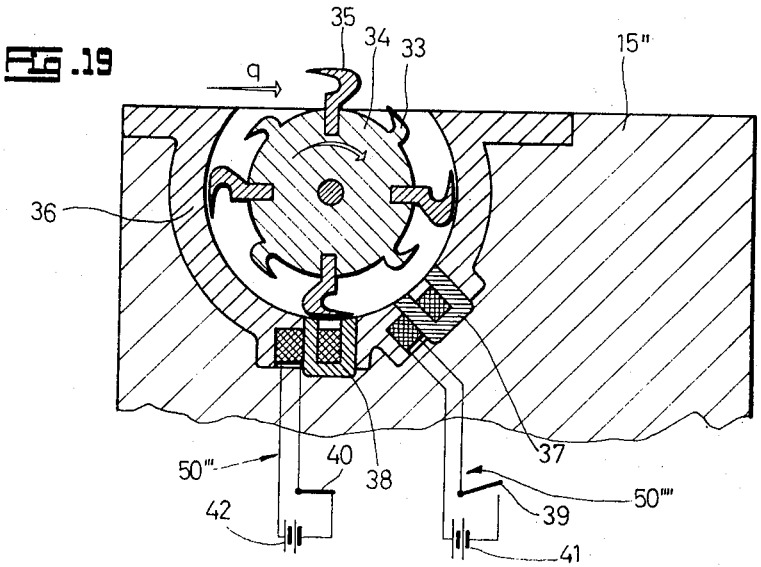
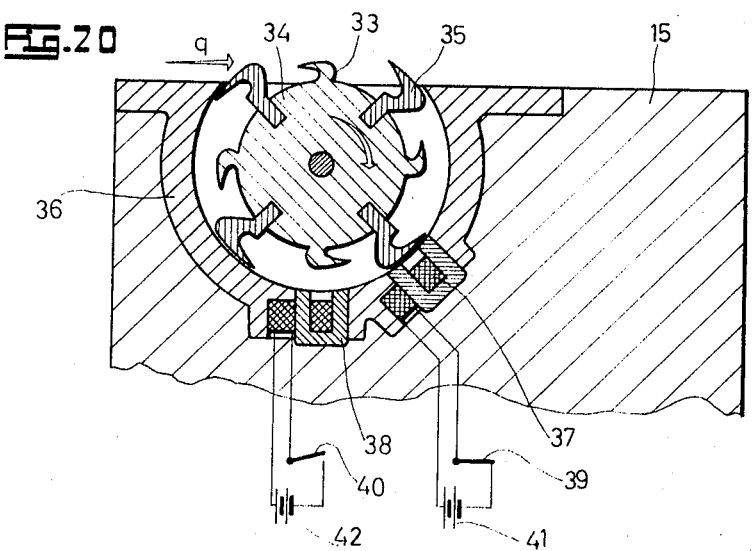

3,448,811
DEVICE FOR STABILIZING THE ROTOR BLADES OF A ROTARY WING AIRCRAFT
Hans Derschmidt, Munich, Germany, assignor to Bolkow Gesellschaft mit beschrankter Haftung, Ottobrunn, near Munich, Germany
Filed Jan. 9, 1968, Ser. No. 696,614
Int. Cl. B64c *27/72*
U.S. Cl. 170—160.25 16 Claims

ABSTRACT OF THE DISCLOSURE

A control device for changing the speed of rotor blades of a rotating wing of a rotary wing aircraft includes an aerodynamic drag device associated with each blade. The rotor comprises a rotor head having a plurality of blades mounted on a central hub for pivotal movement about a vertical axis or an axis substantially parallel to the rotor axis. The blades are arranged to oscillate about pivotal mounting in resonance with the rotor speed by the aerodynamic drag device which is preferably located adjacent the outer end of each blade. Control means are associated with each drag device to cause it to move outwardly from the blade and become effective to cause a desired variation of the circumferential speed of each blade by forward and backward pivotal movements of the associated blade during its revolution with the rotor head. The control is such that each blade is imparted with a reduced circumferential speed as it moves forwardly in respect to the directional flight and with an increased circumferential speed as it is moved backwardly with the rotation of the rotor head.

Summary of the invention

The invention relates in general to the construction of rotary wing aircraft rotors and in particular, to a new and useful control device for pivoting the blades of a rotary wing aircraft about a central rotating head in order to provide a free pivotal movement of each blade so that it oscillates in resonance to the rotor speed.

In order to achieve a substantially uniform air flow to the rotor blades of a rotary wing aircraft, it has been found necessary to impart to the blades as they move forwardly a reduced circumferential speed and to the blades moving rearwardly in respect to flight direction an increased circumferential speed during their rotation along with the rotor head. In order to achieve this, it is known to provide a rigid motion transmitting mechanism, for example, push rods for causing the tilting movement of each blade about an axis substantially parallel to the rotor head axis at the location of their pivotal mounts to the head. Such control devices are complicated in design and have considerable weight. In addition, considerable control forces must be expended from the available driving power to restore a resonance condition in those instances of disturbances to the aircraft and to make the blades pivot in the correct phase relation during the rotation of the head. The pivotal movement of the blades has been carried out by imbalance producing masses which are set in rotation at a speed either comparable to the rotor speed or a multiple of such speed and such means provide a relatively inexpensive and uncomplicated means for effecting the control. But in addition to the solution afforded by such means, it is necessary that the pivotal movement of the blades be carried out by an additional device before the control by the production of an imbalance becomes effective. For this reason this arrangement is of significance only in combination with a rigid motion transmitting mechanism.

It has been suggested that variations in the energy potential of the individual rotor blades which appear in the course of the rotating cycle, can be compensated by device engaging the rotor blades and effecting an intermittent influence on the pivotal movement of the blades in such a way that the energy potential remains constant during a revolution of the rotor blade head.

Accordingly, it is an object of the invention to provide an improved control for superimposing a pivotal movement on each rotor blade during a portion of the 360° rotational movement thereof with the rotor head in order to insure that the blade moves with a most desirable motion during the rotation of the rotor head. Any resonance variations occurring during rotation can be compensated by an aerodynamic drag mechanism arranged adjacent the end of each rotor blade. The drag mechanism is constructed to act periodically during a revolution of the rotor head in an angular range during the forward movement of the associated blade to produce a retarding of the circumferential velocity of the blade during this forward movement and thus a corresponding increase of the velocity as the blade moves beyond the forward direction of flight in a retreating or rearward direction. The control advantageously operates through an angular range of substantially 90° which takes place during a positioning of the blade substantially midway between its forward angular range of movement in respect to the direction of flight.

Such a control provides an inexpensive uncomplicated construction which because of its technical simplicity is not subject to troubles in operation. The control mechanism advantageously includes electromagnetic means for actuating a drag device such as a vane to cause it to project outwardly from the tip of the rotor to provide the necessary aerodynamic drag at the proper orientation of the blade in respect to the rotation of the rotor head.

The electrical control means may be simply operated to effect the drag at any desired location of rotor travel and it is periodically or cyclically operated during a rotation of the rotor head in order to achieve the most satisfactory resonance rotating conditions of the rotor blades. The amplitude of the pivotal movement of each rotor blade during both its forward and rearward movement in respect to aircraft flight direction can thus be controlled by the duration of the effectiveness of the drag mechanism during each revolution of the rotor head. The duration of the action to produce a drag is advantageously made over a small angular range, for example, from 45° to 135° so that a very small amplitude of pivotal blade movement is obtained by shifting the starting time of the drag mechanism during a revolution of a rotor head. The phase position of the pivotal movement can be displaced at random so that any desired movement of the blades during each revolution of the rotor head can be achieved by a simple control device according to the invention.

Accordingly, it is an object of the invention to provide a rotor head for a rotary aircraft which includes a rotating head portion having a plurality of blades pivotally mounted on said head portion for pivotal movement about axis substantially parallel to the head rotation axis and wherein aerodynamic drag control means are associated with each blade for varying the circumferential speed thereof and for pivoting the blade in a forward and rearward direction during the overall rotatable movement of the head.

A further object of the invention is to provide an aerodynamic drag control for the blades of a rotary wing aircraft which includes a lever member forming an aerodynamic drag vane with means associated with the lever member for causing the vane either to project outwardly from the end of a blade tip to effect an aerodynamic drag or to be positioned within the blade tip so that no aerodynamic drag will be effected.

A further object of the invention is to provide an aerodynamic drag mechanism which includes a rotor having a plurality of vanes which are adapted to be contacted by an air stream to produce rotation of the rotor in association with a lever member forming a vane, and including electromagnetic means for controlling the position of the lever member to either project outwardly from a blade tip or to be positioned within the blade tip and which is connected to the rotor to hold the rotor against rotary movement so that the blade elements will provide an aerodynamic drag when desired.

A further object of the invention is to provide a rotatable vane device associated with a blade of a helicopter which includes a plurality of vane elements which may be positioned to project outwardly from the blade tip to provide an aerodynamic drag and having electromagnetic control means for selectively positioning one or more vane elements either within the blade or in a manner such that they project outwardly from the blade to provide an aerodynamic drag.

A further object of the invention is to provide a rotary wing aircraft which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

*Brief description of the drawing*

FIGS. 1 to 12 are schematic top plan views of a helicopter rotor constructed in accordance with the invention;

FIG. 13 is a partial transverse sectional view of a rotor blade having an aerodynamic drag mechanism constructed in accordance with the invention;

FIG. 14 is a view similar to FIG. 13 with the drag mechanism indicated in a retracted position;

FIG. 15 is an end elevational view of the rotor blade indicated in FIG. 13;

FIGS. 16 to 18 are partial transverse sectional views of a rotor blade having another embodiment of aerodynamic drag control mechanism; and FIGS. 19 and 20 are partial transverse sectional views of a rotor blade having another embodiment of aerodynamic drag mechanism.

*Detailed description of the preferred embodiments*

Referring to the drawings in particular, the invention as embodied therein includes a rotor head 1 which rotates counterclockwise at a constant speed and which is moved with a translation velocity $v$ in the direction of the arrow shown in FIGS. 1 and 2 to the left. A pressure head $q$ is formed in the direction from left to right as indicated by the arrow as shown in FIG. 1. In the embodiment illustrated each rotor head 1 includes three blades 2, 3 and 4 which are pivotally mounted on swivel joints or pivots at their inner ends for pivotal movement about an axis which is substantially vertical or parallel to the axis of the rotor head 1.

In accordance with the invention the tips of the blades 2, 3 and 4 are provided with spoilers or drag producing devices 5, 6 and 7 which can be extended periodically from the blade tops in a radial direction. The spoiled 5 of rotor blade 2 is indicated in a projecting position in each of FIGS. 1 to 12 so that a drag retarding effect is produced on the blade 2 as it is moved through an angular range $\alpha$ as shown in FIG. 4.

The angular range $\alpha$ is bisected by a center line $m$ of a blade when the blade is positioned at an angle $\psi$ of 90° from the forwarding or flying direction. The blades 3 and 4 also carry spoilers 7 and 6 respectively which are indicated in a retracted position in FIGS. 1 to 3. The spoilers 6 of blade 4 move outwardly in the angular ranbe of $\alpha$ when the blade 4 is moved into the range during rotation of the rotor head 1 as indicated in FIGS. 4 to 6. In the remaining range of rotational travel the spoiler 6 is retracted as shown in FIGS. 1–3 and 7–12.

The blade 3 carries the spoiler 7 which is extended only during movement through the angular range $\alpha$ as indicated in FIGS. 8 to 10.

The aerodynamic drag vanes 5 annd 6 and 7 are moved so that they project outwardly over the range of movement through the angle $\alpha$ and remain in a recess of the associated blade during the remaining portion of the rotational movement of the associated rotor blades. The drag vanes 5, 6 and 7 are operated by any suitable control mechanism which is actuated in timed relationship to the rotation of the rotor head 1. The tips of the vanes 5, 6 and 7 move along the curve $K_2$ when they are extended to produce a retarding effect on the associated blade and they move along the curve $K_1$ when they are retracted during the remaining movement of the associated blade. Whenever the vane of the associated blade is extended the blade is braked in its rotary movement during rotation of the head 1 and begins to lag behind the rotary movement imparted to the other blades. The maximum rearward deflection of the blades is achieved when the blade passes through the forward flight direction which is indicated by the arrow $v$ in FIG. 1. FIGS. 1 to 12 indicate how each blade in succession is retarded when the associated vane is projected outwardly from its tip up to the point of forward flight and thereafter is again accelerated during the return movement back up to the next phase which is initiated at the beginning of the range indicated by the angle $\alpha$.

In FIG. 13 there is shown a drag mechanism or drag control which is arranged within the outer end of a blade 15 of a type similar to the blades 2, 3 and 4 in FIGS. 1 to 12. The mechanism is contained with the housing 16 which is recessed in the outer end of the blade tip 15. A suitable electrical control circuit generally designated 50 is connected through a passage 52 defined in the blade 15 in order to provide an actuation control of a double armed level or drag member generally designated 54. Movement of the lever 54 is effected by the energization of a coil 13 of an electromagnet having a core 12. The double armed lever 54 is pivotally mounted on a pivot 8 and includes one arm portion 11 which is attracted by core 12 and an opposite arm portion 9 which terminates in an outwardly directed vane or spoiler 10. A spring 14 which is connected between the lever arm portion 9 and the housing 16 urges the vane 10 in a direction at which it will be retracted into the housing as indicated in FIG. 14. This will occur when the electromagnet is deenergized. The housing 16 is secured in position by bolts 19 and 20 so that the end of the blade 15 is flush. A slot 56 is provided in the housing 16 to permit passage of the vane 10.

Current is periodically supplied to the coil 13 from a current source 17 by the actuation of a switch schematically indicated at 18. The switch 18 may, for example, be a rotary type switch which is rotated in association with the rotation of the head in order to periodically actuate the electromagnet only when the associated blade begins moving through the angle range $\alpha$ as indicated in FIG. 4. When this occurs the arm portion 11 will be attracted by the magnet so that the vane 10 will project outwardly from the end of the blade 15 and provide a drag effect thereon.

In the embodiment illustrated in FIGS. 16 to 18 a drag mechanism housing 16' is recessed within the outer tip of a blade 15' and is secured thereto by both elements 19' and 20'. In this embodiment there is provided a doubled armed lever member generally designated 54' which includes an actuating arm portion 28 arranged between poles 30 and 30' of separate electromagnets having respective coils 29, 29' which when actuated will attract the arm portion 28 to an associated core 30 or 30'. The doubled armed lever 54 includes a second arm portion 23 having an offset outer end 27 forming a vane or drag element which projects outwardly through a slot 56' when the magnetic coil 29' is energized as indicated in FIG. 18. When the magnet coil 29 is energized, the vane 27 is retracted within the housing 16' as indicated in FIG. 17.

The drag mechanism also includes a vane wheel 21 which is rotatably mounted with the housing in a manner such that its vanes 22 protrude from the blade tip only during a portion of their circumferential travel during which they are admitted by the air flow moving in the direction of the arrow $q$ to cause the rotor 21 to rotate in the direction indiacted by the arrow $x$. Rotation of the rotor 21 may be stopped in order to increase the drag effects at the end of the blade 15' by those vanes 22 which project from the housing 16 by the actuating of the double armed lever 54'. The arrangement indicated in the drawings provides for the holdings of the rotor 21 against rotation by connecting rod 25 which is engaged with a crank 21a which is carried eccentrically on the wheel 21. The other end of the connecting rod 25 engages a projection 26 of the double armed lever 54' so that the crank arm can be shifted about the axis of the pivot 24 of the doubled armed lever, in the tilted end positions of the doubled armed lever 54' indicated in FIGS. 17 and 18, lever arm 28 appears on the core 30 and 30' respectively.

In FIG. 16 the double arm lever 54' is in a center non-operated position in which it is not attracted by any of the cores 30 and 30'. The respective coils 29, 29' are connected to respective electrical circuits 50 and 50" which includes switches 32 and 31 respectively.

When the vane wheel 21 is turned 90° by the force of the pressure head $q$ in the direction of the arrow $x$ from the position indicated in FIG. 16, the double armed lever 54' tilts clockwise to cause the vane 27 to be brought into the aerodynamically ineffective position represented in FIG. 17. Lever arm 28 then bears on the core 30 and is retained thereafter the contact 32 is closed by a control (not shown) which is operated by rotation of the rotor hear 1. In the actuated position the lever 54' is blocked so that the wheel 21 is prevented from rotating. The vane 27 remains in a retracted position until the control device opens the contact 32 to cause the wheel 21 to rotate and to shift the double arm lever 54' to the position indicated in FIG. 18. The core 30' having been energized by the energization of its coil 29' retains the lever 54' in the actuated position of FIG. 18 so that the projecting vane 27 and those of the blades 22 which project out of the housing will provide a drag effect on the blade 15'.

In the embodiment illustrated in FIGS. 19 and 20 there is provided a blade 15" having a vane wheel 34 mounted within the housing 36. The vane wheel 34 carries on its circumference short vanes 33 and between each pair of short vanes there is a longer vane 35. Each longer vane is made of a magnetizable material such as iron so that it can be attracted and held by one of two electromagnets 37 and 38 having electrical energizing control circuits 50''' and 50'''' respectively. The vanes 35 extend in a radial direction further than the vanes 33 and in the position indicated in FIG. 19 one of the longer vanes 35 is shown in an actuated position held by the magnet 38 and in FIG. 20 the magnet 37 is indicated as holding one of the vanes in a fixed location. The associated electrical circuits 50" and 50'''' include an energizing source 42 and 41 respectively and a switch 40 and 39 respectively which is operated by rotation of the rotor head of the rotary wing aircraft.

In the operation of the devices at the position indicated with which the switch 40 closed the magnet 38 holds one of the blades 35 in the position indicated so that the blade on the diametrically opposite side of the rotor 34 projects from the edge of the blade of the rotor blade 15" into a position at which it will produce an aerodynamic drag on this blade. The wind forces $q$ acting on the blades 33 and 35 causes rotation of the rotor 34 whenever the electromagnets 37 and 38 are not operative. When the contact 39 is closed one of the large vanes 35 is held by the electromagnet 37 so that only a small vane 33 will protrude from the end of the rotor blade 15". In the position represented in FIG. 20, there is only a slight drag acting on the blade 15".

By selectively retaining and positioning the large vanes 35 by means of a magnet 37 or 38 the aerodynamic drag can be varied periodically in accordance with the conditions of the rotor head 1 in order to achieve the desirable effects described in respect to the representations indicated in FIGS. 1 to 12. The embodiment indicated in FIGS. 19 and 20 has the great advantage that it requires no mechanical operating leverages and the holding magnets 37 and 38 can be made very light and small. In addition the mechanism is simple and reliable because it has only a single rotating part.

While specific embodiments of the invention have been shown and described in detail to illustrate the application of the inventive principles, it will be understood that the invention may be embodied otherwise without departing from such principles.

What is claimed is:

1. A device for superimposing pivotal movements of individual rotor blades of a rotating rotar head of a rotary wing aircraft about axes defined by the pivotal connections of said rotor blades to said rotor head and which axes are substantially parallel to the axis of rotation of the rotor head in order to vary the circumferential speed of each blade during its course of travel as the rotor head rotates through each complete revolution, comprising an aerodynamic drag vane adapted to be carried by each of said blades, and control means connected to each of said drag vanes and adapted to be connected to said rotor head for operation in timed sequence with said rotor head for periodically moving said drag vane to an effective position at which said drag vane projects from its associated blade to provide a drag on the blade to slow its circumferential speed and alternately to move said drag vane to an ineffective position to lessen the drag on the blade and to permit an increase of its circumferential speed during rotation of said rotor head.

2. A device according to claim 1, wherein said control means is operated to move said drag vane to an effective position when its associated rotor blade is being moved through an angular range which is bi-sected by an angle which extends substantially 90° from the forward direction of travel of said rotary aircraft.

3. A device according to claim 1, wherein said control means includes an electrical control circuit including a control switch which is adapted to be connected to the rotor head and operated by the rotation of the rotor head to cause projection of the drag vane at a predetermined position of the associated blade in respect to the rotation of the rotor head.

4. A device according to claim 3, wherein said electrical control circuit includes an electro-magnet, said drag vane being connected to a magnetizable member which is movable by said energization of said electromagnet to project said drag vane outwardly from its associated blade.

5. A device according to claim 1, wherein said control means comprises a rotatable wheel having a plurality of drag vane elements, means mounting said wheel in a position wherein said drag vane elements are retained within said rotor blade but will move outwardly beyond the end of the rotor blade during the rotation of said wheel, and electromagnetic means adapted to be connected to the rotor head for sequential operation and being located adjacent said wheel in a position to selectively hold said drag vanes alternatively in a position at which one of said vanes projects outwardly from the end of the rotor blade and in which all of said blades are retracted within said rotor blade.

6. A device according to claim 5, wherein said rotor wheel carries relatively small size driving vanes between each of said drag vanes which are arranged to project outwardly beyond the blade tip when one of said drag vanes is held by said elecctromagnet in a position in which all of the other of said drag vanes are retracted within said housing.

7. A device according to claim 1, wherein said control means includes an electromagnet adapted to be connected to the rotor head for energization in accordance with the angular position of said rotor head, a doubled arm lever pivotally mounted on said electromagnet and including one arm adapted to be retracted by said electromagnet and an opposite arm carrying a drag vane being movable upon such energization to a position at which said drag vane projections from the associated rotor blade, to produce an aerodynamic drag.

8. A device according to claim 7, including spring means for urging said second arm to a non-operative position at which said drag vane is retracted within the end of said rotor blade.

9. A device according to claim 7, including a rotatable wheel having a plurality of vanes projecting radially outwardly therefrom, means mounting said wheel in a position in respect to the associated aircraft blades so that only the vanes from one portion of said wheel extend outwardly from the associated aircraft blade, and means connected between said double arm lever and said wheel to hold said wheel against rotation when said double arm lever is energized by said electromagnet but to permit rotation of said wheel when the said first arm is not energized by said electromagnet.

10. A device for superimposing pivotal movements of individual blades of a rotating rotor head of a rotary wing aircraft about axes defined by the pivotal connections of the blades to the rotor head which pivotal connections are parallel to the axis of rotation of the rotor head, for the purpose of varying the circumferential speed of each blade during its course of travel as the rotor head rotates through each complete cycle of rotation, comprising a housing adapted to be recessed into each of the rotor blades, an electromagnet in said housing, a vane member which is movable by actuation of said electromagnet arranged in said housing adjacent said electromagnet, said vane member having a vane portion which is selectively projected from said housing and retracted into said housing by actuation of said electromagnet is energized, said vane portion in the projected position extending outwardly from said housing to produce an aerodynamic drag on the movement of the associated rotor blade, and electrical control means connected to said electromagnet for periodically actuating said electromagnet during the rotation of the rotor blade with the rotor head.

11. A device according to claim 10, including a spring connected to said vane member to urge said vane member in a non-actuating position and to withdraw it into said housing when said electromagnet is not energized said housing when said electromagnet is not energized.

12. A device according to claim 10, including a wheel mounted in said housing having a plurality of vane elements some of which always project from said housing and cause rotation of said wheel, and means connected between said lever member and said wheel to lock said wheel when said magnet is energized.

13. A device according to claim 12, including two separate electromagnets arranged on opposite sides of said vane member, one of said magnets when energized causing said vane member to retract said vane position within said housing.

14. A device according to claim 10, wherein said vane member comprises a plurality of actuating vanes carried by a wheel, said electromagnet when actuated holding one of said actuating vanes in a fixed position within said housing so that another one of said actuating vanes on said rotor projects outwardly from said housing.

15. A device according to claim 14, including small sized driving vane located between each of said actuating vanes and being oriented so that a driving vane will be projected out of said housing to rotate said rotor when said electromagnet holds said actuating vanes in a non-operative position.

16. A device according to claim 10, wherein said vane member comprises a rotatable wheel with a plurality of vane portions and including spaced locations in respect to said wheel, one of said electromagnets being oriented to hold one of said vane portions in a position at which none of said vane portions projects outwardly from said housing and the other of said electromagnets being located to hold said wheel in a position in which at least one of said vane portions projects outwardly from said housing.

References Cited

UNITED STATES PATENTS

| | | |
|---|---|---|
| 2,957,526 | 10/1960 | Derschmidt. |
| 3,038,543 | 6/1962 | Davidson. |
| 3,204,701 | 9/1965 | Müller et al. |
| 3,232,348 | 2/1966 | Jarosch. |
| 3,289,770 | 12/1966 | Derschmidt. |
| 3,303,887 | 9/1967 | Pfleiderer. |

EVERETTE A. POWELL, JR., *Primary Examiner.*